Jan. 19, 1954
C. R. NALLE
2,666,334
THREADED ARTICLE AND SUPPORT THEREFOR
Filed July 17, 1947
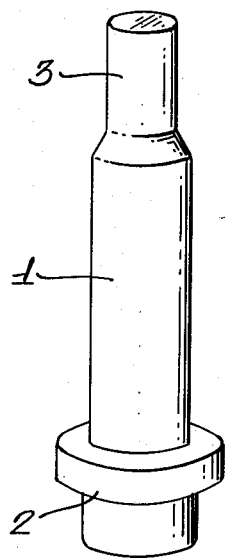
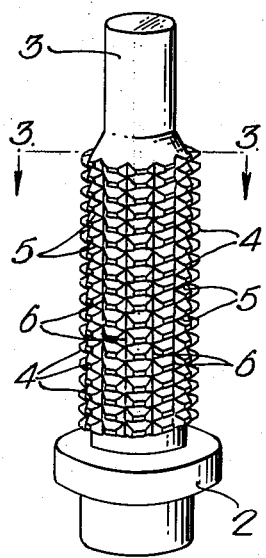
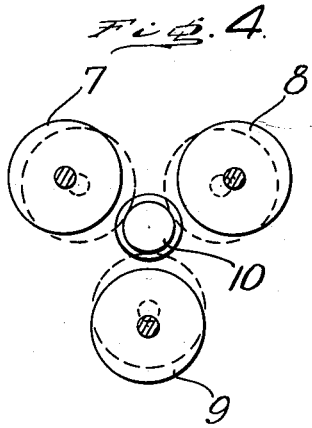
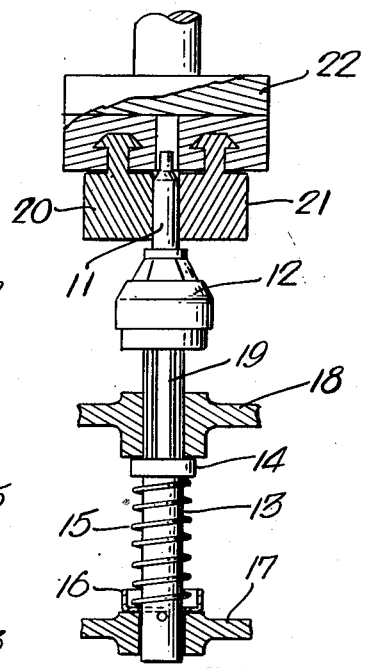
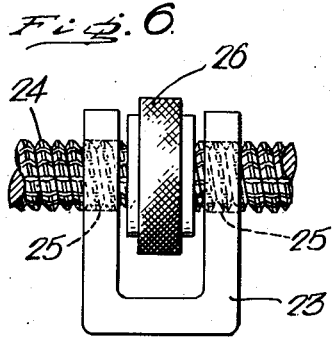
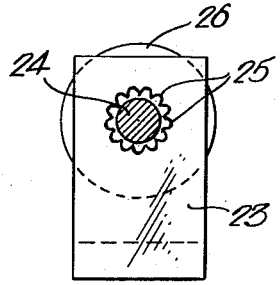
INVENTOR.
Charles R. Nalle
BY
Howson & Howson
Attys.

Patented Jan. 19, 1954

2,666,334

UNITED STATES PATENT OFFICE 2,666,334

THREADED ARTICLE AND SUPPORT
THEREFOR

Charles R. Nalle, Philadelphia, Pa.

Application July 17, 1947, Serial No. 761,641

1 Claim. (Cl. 74—424.8)

This invention relates to the combination of a screw-threaded metal article and a support therefor.

There are many instances where it is desired to employ a screw-threaded shank and to make some provision for prevention of turning of the shank relative to an associated nut or other member. For example, in adjustable casters and glides, it is common practice to employ a screw-threaded shank to enable vertical adjustment, and to make provision for prevention of turning of the shank during use which would result in misadjustment. The prevention of the turning of the threaded shank in such a device requires that the shank be provided with one or more splines or some equivalent means for cooperation with complemental means on an associated element. Heretofore, the required shank structure has been provided by machine operations which are time consuming and costly and which necessarily entail a certain amount of waste.

The present invention has for its principal object the provision of a structure which may be formed easily and inexpensively, thus overcoming the above objections.

Another object of the invention is to provide a novel combination including a screw-threaded and splined shank of the character hereinafter described.

In the accompanying drawings:

Fig. 1 is a perspective view of a metal object on which it is desired to provide a screw-threaded and splined shank;

Fig. 2 is a similar view of the same object after the formation of the screw-thread and splines thereon according to the present invention;

Fig. 3 is a sectional view taken along line 3—3 of Fig. 2, showing more clearly the peripheral contour of the shank;

Fig. 4 is an illustration of the manner in which the thread and splines may be formed on the shank of an object such as that shown in Figs. 1 and 2;

Fig. 5 is a fragmentary sectional illustration of a machine which may be employed in forming the shank according to the present invention;

Fig. 6 is an elevational view of a simple structure employing the threaded and splined shank provided by the invention; and Fig. 7 is a view taken from the right-hand side of Fig. 6.

The object shown in Figs. 1 and 2 is an element of an adjustable glide, and it has been chosen merely as an example of any object on which it is desired to provide a screw thread and splines.

In the specific object illustrated, it is desired to provide a screw-thread and splines on the shank portion 1 between the end portions 2 and 3 which are unimportant as far as the present invention is concerned.

In accordance with the present invention, the object illustrated is first formed with the cylindrical shank 1, as shown in Fig. 1. It is important to note that the cylindrical shank 1 is of a predetermined diameter less than the over-all diameter of the finished shank illustrated in Fig. 2. The reason for this is that the screw-thread and splines are formed on the shank, according to the present invention, by displacing the surface metal of the shank as hereinafter described.

In accordance with the invention, the shank 1 of the exemplary object shown in Fig. 1 is subjected to concurrent forming actions which bring about the shank formation shown in Figs. 2 and 3. One of the forming actions serves to provide a screw-threaded structure on the shank, while another of the forming actions serves to provide a plurality of splines thereon. It will be noted from Fig. 2 that the finished shank has a surface formation consisting of multitudinous projecting elements 4 which are defined by a helical thread groove 5 and by the spline grooves 6. Conversely, it may be said that the elements 4 collectively define a screw-thread and a plurality of splines, said elements being arranged helically and also being arranged in longitudinal rows. Each of the elements 4 constitutes a small part or section of a convolution of a helical screw thread extending from one end of the shank to the other end thereof. The spline grooves 6 are of lesser depth than the thread groove 5, and while the spline grooves produce numerous depressions in the thread, the thread is effectively continuous and its function is not impaired. Both the thread and the splines are well defined and neither alters the essential character of the other. This is due to the fact that the screw thread and splines are formed simultaneously by a working displacement of the surface metal of the shank. It will be noted from Fig. 3 that there are thirteen splines in the shank structure illustrated, and there are thirteen of the projecting elements 4 in each convolution of the helical thread. Yet the thread retains its essential character and is in no way impaired.

The concurrent thread-forming and spline-forming actions may be carried out in any suitable machine having proper dies. It has been found by experiment that a thread-rolling machine of the type employing cylindrical dies is very satisfactory. The illustrations of Figs. 1 and 2 were prepared from actual samples. The sample object illustrated in Fig. 2 was produced in a machine equipped with three cylindrical dies arranged as shown in Fig. 4 at 7, 8 and 9. The dies move radially inward to engage the work piece 10. In operation, the dies are rotated at the same speed about their axes and the work piece is held only by the dies and is rotatable.

In the use of the above-mentioned machine for the purpose of the present invention, one of the three thread-rolling dies was replaced by a spline-forming die. Thus, in Fig. 4 it may be supposed that dies 7 and 8 are the thread-rolling dies, while die 9 is the spline-forming die. It was found from the use of the above-mentioned machine that objects such as shown in Fig. 2 can be produced at the same rate as objects having only a screw-thread. This is important, of course, from the standpoint of commercial production.

Fig. 5 illustrates a portion of a different type of machine that might be employed in carrying out the above-described method. The work piece 11 is held in a chuck 12 which is carried at the upper end of a rod or shaft 13 having a flange 14 seated on a helical spring 15. The lower end of the spring 15 seats in a cup 16 carried by a stationary support 17, the lower end of the rod 13 being freely movable relative to the support 17. The upper part of the rod 13 is slidably supported by a support 18, and the rod is prevented from turning by means of spline elements 19 thereon cooperating with complementary elements of the support 18.

The cylindrical dies 20 and 21 are carried by a rotatable head 22 which is driven in any suitable manner, for example by means of an electric motor through suitable gearing. The dies are carried by the head in a manner which causes them to move into engagement with the work piece. Preferably there are three dies, two thread-forming dies and one spline-forming die.

During operation of the machine illustrated in Fig. 5, the resilient mounting of the rod 13 permits the work piece 11 to move downward.

Figs. 6 and 7 serve as a simple illustration of a combination utilizing a screw-threaded and splined shank constructed in accordance with the present invention. It may be supposed that the yoke 23 is intended to support a screw-threaded shank and that the shank is to be prevented from turning. In the illustration, there is shown a screw-threaded and splined shank 24 formed according to the present invention. The arms of the yoke 23 are provided with splined apertures, as shown at 25 in Fig. 7, which are complementary to the peripheral contour of the shank 24. A nut 26 is provided on the shank 24 between the arms of the yoke 23. It will be seen that turning of the nut 26 will cause the threaded shank to move longitudinally but the shank is prevented from turning by virtue of the splined engagement with the arms of the yoke.

It will be seen that the present invention provides a screw-threaded and splined shank structure which may be formed easily and inexpensively, and furthermore the invention provides a novel combination including such shank structure which may be utilized for a wide variety of purposes. The above-described method of forming the shank also effects a saving in that it eliminates the wastage incident to machine operations involving the cutting or grinding away of some of the material of the work piece. In general, the method employed is applicable to any metal object which lends itself to surface formation by displacement of the metal, as by rolling.

It will be understood that the invention is not limited by the specific disclosure hereof but it is capable of various modifications.

I claim:

In combination, a shank having a screw thread and a substantial number of closely spaced and continuous longitudinal spline grooves on the surface thereof, said grooves intersecting said thread to form on the surface of said shank multitudinous projecting elements arranged helically and also in longitudinal rows, said elements constituting said thread and defining said longitudinal spline grooves, the spline grooves defined by said longitudinal rows of projecting elements being of lesser depth than the thread grooves defined by said elements whereby said spline grooves intersect said thread and form numerous depressions therein without destroying the effective helical continuity of said thread; a support having an unthreaded aperture through which said shank extends and having continuous longitudinal splines on the wall defining said aperture, said splines being complemental to the spline grooves on said shank whereby engagement between said splines and spline grooves serves to prevent turning of said shank relative to said support; a nut having an unsplined screw threaded bore and cooperatively associated with said support and threadedly engaging the threads on said shank; and means to prevent longitudinal movement of said nut with respect to said support, turning of said nut effecting longitudinal movement of said shank relative to said support.

CHARLES R. NALLE.

References Cited in the file of this patent

UNITED STATES PATENTS

| Number | Name | Date |
| --- | --- | --- |
| 206,795 | Jarecki | Aug. 6, 1878 |
| 324,487 | Rice | Aug. 18, 1885 |
| 516,764 | Fairbairn et al. | Mar. 20, 1894 |
| 856,567 | Beede | June 11, 1907 |
| 1,263,158 | Travers | Apr. 16, 1918 |
| 1,367,408 | McClurkin | Feb. 1, 1921 |
| 1,391,633 | Hazelton | Sept. 20, 1921 |
| 1,593,088 | Lowe | July 20, 1926 |
| 1,794,442 | Cannon | Mar. 3, 1931 |
| 1,819,697 | Bondette | Aug. 18, 1931 |
| 1,930,506 | Brown et al. | Oct. 17, 1933 |
| 2,161,611 | Boggild | June 6, 1939 |
| 2,232,336 | Meersteiner | Feb. 18, 1941 |
| 2,257,234 | Gould | Sept. 20, 1941 |
| 2,278,344 | Baker | Mar. 31, 1942 |
| 2,302,675 | Cherry | Nov. 24, 1942 |
| 2,576,575 | Collins | Nov. 27, 1951 |